(12) United States Patent
Horne

(10) Patent No.: US 7,892,389 B2
(45) Date of Patent: Feb. 22, 2011

(54) REINFORCING MAT HAVING THERMALLY FUSED STITCHING

(75) Inventor: Louis Kevin Horne, Salem, AL (US)

(73) Assignee: Garland Industries, Inc., Cleveland, OH (US)

(*) Notice: Subject to any disclaimer, the term of this patent is extended or adjusted under 35 U.S.C. 154(b) by 0 days.

(21) Appl. No.: 12/773,212

(22) Filed: May 4, 2010

(65) Prior Publication Data

US 2010/0212808 A1  Aug. 26, 2010

Related U.S. Application Data

(60) Division of application No. 11/607,107, filed on Nov. 16, 2006, which is a continuation-in-part of application No. 11/112,783, filed on Apr. 22, 2005, now Pat. No. 7,598,187, which is a continuation of application No. 10/240,155, filed on Sep. 27, 2002, now abandoned, which is a continuation of application No. PCT/US01/21508, filed on Jul. 9, 2001, now abandoned.

(60) Provisional application No. 60/216,607, filed on Jul. 7, 2000.

(51) Int. Cl.
*B29C 65/00* (2006.01)

(52) U.S. Cl. ................ 156/282; 442/367; 442/361; 442/364; 428/296.7

(58) Field of Classification Search ........... 442/367, 442/361, 364; 428/296.7
See application file for complete search history.

(56) References Cited

U.S. PATENT DOCUMENTS

| 4,528,223 | A |   | 7/1985 | Kumazawa |
|-----------|---|---|--------|----------|
| 5,203,186 | A |   | 4/1993 | Zafiroghu |
| 5,445,693 | A |   | 8/1995 | Vane |
| 5,612,114 | A |   | 3/1997 | Zalewski et al. |
| 5,753,338 | A |   | 5/1998 | Jelic et al. |
| 5,795,835 | A | * | 8/1998 | Bruner et al. ............ 442/310 |
| 5,809,805 | A |   | 9/1998 | Palmer et al. |
| 5,902,757 | A |   | 5/1999 | Stern et al. |
| 2004/0121685 | A1 |   | 6/2004 | Hallam |

FOREIGN PATENT DOCUMENTS

FR    2594858       8/1987
WO    WO 02/04725   1/2002

* cited by examiner

*Primary Examiner*—Lynda Salvatore
(74) *Attorney, Agent, or Firm*—Fay Sharpe LLP; Brian E. Turung

(57) ABSTRACT

A reinforced fabric that includes a first fiber group and a thread. The first fiber group includes a plurality of fiber sets positioned substantially parallel to one another. Each of the fiber sets includes a plurality of fibers. The thread is formed of at least one strand of material. The thread has an outer surface that is formed of a material having a melting point that is less than the melting point of the fibers in the fiber sets. The thread is stitched about the fiber sets to at least partially maintain a position of the fiber sets relative to one another. The thread forms a plurality of heat created permanent closed loop structures in the reinforced fabric. At least one of the loop structures encircles at least one fiber set. At least one of the fibers in the fibers sets is not strongly bonded to the thread that encircles the fiber set.

14 Claims, 1 Drawing Sheet

REINFORCING MAT HAVING THERMALLY FUSED STITCHING

The present invention is a divisional of U.S. patent application Ser. No. 11/607,107 filed Nov. 16, 2006, which in turn is a continuation-in-part of U.S. patent application Ser. No. 11/112,783 filed Apr. 22, 2005, now U.S. Pat. No. 7,598,187 which in turn is a continuation of U.S. patent application Ser. No. 10/240,155 filed Sep. 27, 2002, now abandoned, which in turn is a continuation of International Application Serial No. PCT/US01/21508 filed Jul. 9, 2001, now abandoned, which in turn claims priority on U.S. Provisional Application Ser. No. 60/216,607 filed Jul. 7, 2000, now abandoned.

The present invention relates to a reinforced fabric, and particularly to a reinforced fabric that is formed by woven and/or non-woven fibers that are held in position by a stitched or knitted thread, and more particularly to a reinforced fabric that is formed by woven and/or non-woven fibers that are held in position by a stitched or knitted thread which thread is at least partially melted together.

BACKGROUND OF THE INVENTION

Reinforcement mats are used in many industries for adding strength to composite materials. Such mats are, in fact, generally referred to as composite reinforcements.

The reinforcement mats are typically formed in a location that is remote from place and time to the use of the reinforcement mat. As such, it is necessary to maintain the fibers of the mat in a predetermined configuration from the point of manufacture until the time of use. Typically, the reinforcement mats are stitched together or adhesively secured together to maintain the fibers in position. Although the use of stitching is generally effective to holding the fibers together, the stitching has some play, thus enabling the fibers to shift during transport of the reenforced mat, thus potentially compromising the strength and/or rigidity of the reinforcement mat. Stitching of the fibers together inherently provides relatively large loops or other closed circuits of the stitching. When reinforcing mats are stitched together in the manner known in the prior art, any activity which causes breaks in the stitching or pulls the stitching out of place can result in an undesired disruption of the fiber matrix which the stitching has created. For example, cutting the reinforcement mat, snagging the stitching and the like, can result in "unzipping" the stitching, thereby destroying the predetermined fiber orientation on the reinforcement mat. Likewise, when the reinforcement mat is cut into sections for use in a particular application, the stitching is severed at the ends of the reinforcement mat and can result in the "unzipping" of the stitching. In order to address these problems, the stitching thread can be melted onto the fibers of the reinforcement mat to lock the fibers in place. An example of such a mat is disclosed in Bruner U.S. Pat. No. 5,795,835. Although the locking of the fibers by melting of the stitching thread maintains the fibers in rigid place with respect to one another, the flexibility of the reinforcement mat is significantly reduced. In many applications, the reinforcement mat is wrapped about a structure (e.g., pole, column, etc.) to provide support and/or strength to such structure. When the stitching on the reinforcement mat is melted onto the fibers, the stitching is susceptible to breaking when the reinforcement mat is wrapped about a structure. The breaking of the stitching can compromise the strength and durability of the reinforcement mat. Similarly, when the fibers are connected together by an adhesive, the bending of the reinforcement mat can cause the adhesive to break and/or release from the fibers thereby compromising the strength and durability of the reinforcement mat.

When reinforcement mats are impregnated with a liquid material, the adhesive on the reinforcement mat is susceptible to softening or dissolving, thereby compromising the strength and durability of the reinforcement mat. The softening or dissolving of the adhesive can also result in the movement of the fibers during the impregnation process, thereby potentially compromising the strength, durability and/or quality of the final product. In addition, certain adhesives can adversely affect the ability of the impregnating liquid to fully wet and saturate the fibers in the reinforcement mat thereby adversely affecting the strength, durability and/or quality of the final product. Furthermore, the impregnation process generally works best when the fibers on the reinforcement mat are held together in only a proximal relationship, but are not affixed to one another, to allow the penetration of the impregnating liquid about the fibers.

In an effort to address the past problems of reinforcement mats, a new type of reinforcement mat disclosed in WO 02/04725 was developed, which is incorporated herein by reference. The reinforcement mat was designed to be useful in the formation of reinforcing composite materials. The reinforcement mat is formed of at least first and second sets of fibers wherein the first set of fibers is laid as a ply in spaced apart parallel relationship in the direction of construction and the second set of fibers are laid as a ply in spaced apart parallel relationship which is perpendicular to the direction of construction. These two sets of fibers define interstices into which a continuous filament is knitted to provide stability. The filament has a core portion and a sheath portion having a lower melting point than the core portion. The sheath portion is thermally fusible to form a plurality of closed loops in which the respective sets of fibers are entrapped.

Although the reinforcement mat disclosed in WO 02/04725 solves many of the problems associated with past reinforcement mats, there continues to remain a need for improved reinforcement mats and methods for forming such improved reinforcement mats.

SUMMARY OF THE INVENTION

The present invention is directed to a reinforced fabric that can be used alone or subsequently processed (e.g., partially or fully impregnated with a material, etc.) to provide structural support, rigidity, etc. to a variety of structures (e.g., roofing materials, building siding materials, poles, support columns, fiber composite panels [i.e., fiberglass panels, etc.], boat hulls, flooring, pavements, etc.). These reinforced fabrics can be impregnated with a liquid material, such as a resin, a bitumen or the like to form a composite material however, this is not required. These reinforced fabrics can be secured to a base structure (e.g., wood board, concrete wall, wood or composite column or pole, etc.) by mechanism (i.e., nail, tact, staple, etc.) and/or by an adhesive to provide additional strength and/or rigidity to the base structure. The reinforced fabric can be coated with one or more coatings (e.g., paint, resins, plastic, etc.) to provide further strength and/or rigidity to the base structure and/or to created the desired look or finish for the final product. The reinforced fabric is formed by a plurality of fibers that are at least partially held together and at least partially held in position by one or more stitched or knitted threads. As defined hereinafter, any reference to "stitch", "stitching" or "stitched" will broadly refer to any type of stitching, knitting, knotting, and/or crocheting technique. The fibers used in the reinforced fabric can be woven fibers, non-woven fibers or some mixture thereof. The thread used in the reinforced fabric is selected to have an outer surface that has a melting point that is less than the melting point of the surface of one or more fibers in the reinforced fabric.

In one non-limiting aspect of the present invention, many different types of fiber materials can be used to form the reinforced fabric. The reinforced fabric can be formed of the same or different compositional type of fibers. The fibers in the reinforced fabric can have the same or different sized and/or shaped cross-sectional area. The fibers in the reinforced fabric can have the same or different color. In one non-limiting embodiment of the invention, the fibers can include materials such as, but not limited to, glass fibers (e.g., silica glass, aramid glass, etc.), carbon fibers, quartz fibers, Kevlar® fibers, boron fibers, polyethylene fibers, polyamide fibers, polypropylene fibers, etc. The fibers can be formed of a single material or be a hybrid of one or more materials. In another and/or additional non-limiting embodiment of the invention, a majority of the fibers in the reinforced fabric are non-woven fibers. In still another and/or additional non-limiting embodiment of the invention, a majority of the fibers in the reinforced fabric are woven fibers such as, but not limited to a roving of fibers. In yet another and/or additional non-limiting embodiment of the invention, several sets of fibers are oriented together and then at least partially secured in position relative to one another to form the reinforced fabric. In one non-limiting aspect of this embodiment, at least one set of fibers is formed of a plurality of fibers. The shape, size, color and/or composition of the fibers in each set of fibers can be the same or different. In one non-limiting design, the shape, size and composition of a majority of the fibers in at least one set of fibers are substantially the same. In another and/or additional non-limiting design, a majority of the fibers in at least one set of fibers are non-woven fibers (e.g., laid fibers, etc.). In still another and/or additional non-limiting design, a majority of the fibers in at least one set of fibers are woven fibers. In yet another and/or additional non-limiting design, at least a portion of the fibers in at least one set of fibers are non-woven fibers and at least a portion of the fibers are non-woven fibers. For instance, the core of a set of fibers could be woven or non-woven fibers and the outer region of the set of fibers could be formed of non-woven or woven fibers.

In another and/or additional aspect of the present invention, many types of thread can be used in the reinforced fabric. The thread can be made of a single material of a composite material. The thread can have the same or different shape, color and/or size from the fibers used in the reinforced fabric. In one non-limiting embodiment of the invention, the thread is formed of a single material. The single material that forms the thread is selected to have a melting point that is less than the surface of a majority of the fibers contacted by the thread. In one non-limiting aspect of this embodiment, the thread is formed of a polymer material that includes a material such as, but not limited to, nylon, polyester, polypropylene, polyethylene, polyurethane, poly(meth) acrylate, etc. In another and/or additional non-limiting embodiment of the invention, the thread is formed of a plurality of materials. In one non-limiting aspect of this embodiment, the thread includes an outer coating material and a core material. The outer coating material typically has a different melting point temperature than the core material. In one non-limiting design, the core has a higher melting point than the outer coating material. In one non-limiting particular aspect of this design, the material forming the core has a melting point temperature that is at least about 10° F. greater than the outer coating material, typically at least about 20° F. greater than the outer coating material, more typically at least about 30° F. greater than the outer coating material, and still even more typically at least about at least about 40° F. greater than the outer coating material. In another and/or alternative non-limiting particular aspect of this design, the material of the core includes a lower viscosity polyester (e.g., polyethylene terephthalate polyester, etc.) and the outer coating includes polypropylene, polyethylene, polyurethane, poly(meth) acrylate, high melting point polyester, and copolymers thereof. In still another and/or additional non-limiting embodiment of the invention, the outer surface of the thread has a melting point temperature that is at least about 50° F. greater than the outer surface of a plurality of fibers in the reinforced material, typically at least about 100° F. greater than the outer surface of a plurality of fibers in the reinforced material, more typically at least about 200° F. greater than the outer surface of a plurality of fibers in the reinforced material, and still even more typically at least about 400° F. greater than the outer surface of a plurality of fibers in the reinforced material.

In still another and/or additional aspect of the present invention, the reinforced fabric includes a plurality of fiber sets forming a first fiber group that is laid as a ply in spaced apart parallel relationship. Typically each fiber set has generally the same number of fibers; however, this is not required. The number of fibers in a fiber set generally is about 2-10000, and typically about 5-100, and more typically about 10-80; however, other numbers of fibers in a fiber set can be used. Typically the fiber set includes a plurality of layers of fibers; however, this is not required. The thickness of at least one fibers set is generally at least about 0.1 mm, and typically at least about 0.25 mm; however, other thickness can be used. The width of a fiber set is generally greater than the thickness of the fiber set; however, this is not required. Typically the width of at least one fiber set is at least about 0.5 mm, and more typically at least about 1 mm; however, other widths can be used. Typically each fiber set is spaced at generally the same distance apart from one another; however, this is not required. Each set of fibers is generally formed of the same material; however, this is not required. As can be appreciated, each set of fibers can be formed of the type of material or same mixture of materials, however, this is not required. Likewise, when the reinforced fabric is formed of multiple fiber groups, the fibers in each group can be the same or different material. In one non-limiting embodiment of the invention, one or more threads are stitched to the plurality of fiber sets to maintain the relative position of the plurality of fiber sets from one another. In another and/or alternative non-limiting embodiment, the reinforced fabric includes a second fiber group that is formed of a plurality of fiber sets. The second fiber group in laid at least partially on the first fiber group in a non-parallel relationship to the first fiber group. Typically each fiber set in each fiber group has generally the same number of fibers; however, this is not required. Typically each fiber set in a fiber group is spaced at generally the same distance apart from one another; however, this is not required. The portion of a set of fibers in the second fiber group laying on a set of fibers in the first fiber group is defined as an interstice. One or more threads are stitched at a plurality of the interstices formed by the first and second fiber groups to at least partially maintain the relative position of the fibers sets in each fiber group to one another. In one non-limiting aspect of this embodiment, the second fiber group in laid at least partially on the first fiber group such that the second fiber group has an angular orientation to the first fiber group of about 10-90°. In one non-limiting design of this aspect, the second fiber group is laid at least partially on the first fiber group such that the second fiber group has an angular orientation to the first fiber group that is generally perpendicular. In still another and/or alternative non-limiting embodiment, the reinforced fabric includes a third fiber group that is formed of a plurality of fiber sets. The third fiber group in laid at least partially on the first and second fiber groups in a non-parallel relationship to the first and second fiber groups. Typically each fiber set in each fiber group has generally the same number of fibers; however, this is not required. Typically each fiber set in a fiber group is spaced at generally the same distance apart from one another; however, this is not required. The portion of a set of fibers in the first, second third groups laying on one another is defined as an interstice. One or more threads are stitched at a plurality of the interstices formed by the first, second and third fiber groups to at least partially maintain the relative position of the fibers sets in each fiber group to one another. In one non-limiting aspect of this embodiment, the third fiber group in laid at least partially on the first and second fiber groups such that the third fiber group has an angular orientation to the first and second fiber groups of about 10-80°. In one non-limiting design of this aspect, the second fiber group is laid at least partially on the first fiber group such that the second fiber group has an angular orientation to the first fiber group that is generally perpendicular, and the third fiber group is laid at least partially on the second fiber group such that the third fiber group is about 45° to the first and second fiber groups. In yet another and/or alternative non-limiting embodiment, the reinforced fabric includes more than three fiber groups. Each fiber group is formed of a plurality of fiber sets. Each fiber group is laid such that none of the adjacent positioned fiber groups are parallel to one another.

In yet another and/or additional aspect of the present invention, the one or more threads used to at least partially maintain the relative position of the fiber sets in one or more fiber groups are looped about one or more fiber sets such that a portion of the thread forms a substantially closed loop about one or more fiber sets. The intersecting portion of the thread is at least partially fused together by radiation and/or heat. The fusing of the thread portions is accomplished in a manner such little, if any, portion of the outer surface of the fibers that are in contact with the thread are melted or thermally degraded. The fusing of the intersecting thread portions forms a permanent closed loop structure about one or more sets of fibers of one or more fiber groups thereby entrapping one or more sets of fibers in one or more closed set loops of thread. In one non-limiting embodiment of the invention, the stitched reinforced fabric is exposed to and/or heated to a temperature that is at least about 50° F. less than the melting point or thermal degradation temperature of the outer surface of the fibers that are in contact with the one or more stitched threads and at least about 1° F. greater than the softening point or melting point of the outer surface of at least one of the threads that contacts the fibers for a time period of at least about 5 seconds to cause the intersecting portion of the thread of at least one of the closed loops of thread to melt and/or fuse together. In one non-limiting aspect of this embodiment, the stitched reinforced fabric is exposed to and/or heated to a temperature that is at least about 100° F. less than the melting point or thermal degradation temperature of the outer surface of the fibers that are in contact with the one or more stitched threads and at least about 2° F. greater than the softening point or melting point of the outer surface of at least one of the threads that contacts the fibers for a time period of at least about 10 seconds to cause the intersecting portion of the thread of at least one of the closed loops of thread to melt and/or fuse together. In another and/or additional non-limiting aspect of this embodiment, the stitched reinforced fabric is exposed to and/or heated to a temperature that is at least about 200° F. less than the melting point or thermal degradation temperature of the outer surface of the fibers that are in contact with the one or more stitched threads and at least about 5° F. greater than the softening point or melting point of the outer surface of at least one of the threads that contacts the fibers for a time period of at least about 10-3600 seconds to cause the intersecting portion of the thread of a plurality of the closed loops of thread to melt and/or fuse together. In still another and/or additional non-limiting aspect of this embodiment, the stitched reinforced fabric is exposed to and/or heated to a temperature that is about 300° F. less than the melting point or thermal degradation temperature of the outer surface of the fibers that are in contact with the one or more stitched threads and at least about 5° F. greater than the softening point or melting point of the outer surface of at least one of the threads that contacts the fibers for a time period of about 10-3600 seconds to cause the intersecting portion of the thread of a plurality of the closed loops of thread to melt and/or fuse together. In another and/or alternative non-limiting embodiment of the invention, the stitched reinforced fabric is substantially uniformly exposed to and/or heated to a temperature for a period of time that causes the intersecting portion of the thread of a plurality of the closed loops of thread to melt and/or fuse together. In this arrangement, substantially all of the intersecting portions of the thread of the closed loops of thread on the reinforced fabric melt and/or fuse together. In still another and/or alternative non-limiting embodiment of the invention, the stitched reinforced fabric is selectively exposed to and/or heated to a temperature for a period of time that causes the intersecting portion of the thread of a plurality of the closed loops of thread to melt and/or fuse together. In this arrangement, only select portions of the reinforced fabric includes intersecting portions of the thread of the closed loops of thread that are melted and/or fused together. As such, other portions of the reinforced fabric include portions that include intersecting portions of the thread of the closed loops of thread that are not melted and/or fused together. Consequently, a pattern of fused and/or melted loops and non-fused and/or non-melted loops are formed in the reinforced fabric. This pattern of loops can be used to customize the reinforced fabric for a variety of applications. In still yet another and/or alternative non-limiting embodiment of the invention, a plurality of fibers that are entrapped in a closed loop of thread that has had the intersecting portion of the thread melted and/or fused together are able to at least partially move relative to the loop of thread. In this arrangement, the melting of one or more portions of the thread during the fusing and/or melting of the closed loop does not result in the thread binding to all of the fibers that are encircled by the loop of thread. As such, the fibers in the reinforced fabric are able to move relative one or more of the loops of thread to provide some play and flexibility to the reinforced fabric, especially when the reinforced fabric is folded, bend and/or wrapped about a structure. This arrangement also inhibits and/or prevents damage to the closed loops of thread when the reinforced fabric is folded, bend and/or wrapped about a structure. When the fibers are unable to move relative to the closed loops, the folding, bending and/or wrapping of the reinforced fabric can result in one or more of the closed loops to break and/or otherwise be damaged, thereby potentially compromising the strength and/or durability of the reinforced fabric. In one non-limiting aspect of this embodiment, at least one of the fibers that are encircled by a loop of thread that has had one or more portions of the thread fused and/or melted together can at least partially move within and relative to the closed loop and/or can disengage from the thread of the closed loop and can at least partially move within and relative to the closed loop without breaking the closed loop. In another and/or additional non-limiting aspect of this embodiment, a majority of the fibers that are encircled by a loop of thread that has had one or more portions of the thread fused and/or melted together can at least partially move within and relative to the closed loop and/or can disengage from the thread of the closed loop and can at least partially move within and relative to the closed loop without breaking the closed loop. In still another and/or additional non-limiting aspect of this embodiment, substantially all of the fibers that are encircled by a loop of thread that has had one or more portions of the thread fused and/or melted together can at least partially move within and relative to the closed loop and/or can disengage from the thread of the closed loop and can at least partially move within and relative to the closed loop without breaking the closed loop.

In still yet another and/or additional aspect of the present invention, many different types of stitching patterns can be used on the reinforced fabric.

In another and/or additional aspect of the present invention, at least a portion of the reinforced fabric is impregnated with one or more polymer materials to form a reinforced composite material. Many types of polymers can be at least partially impregnated in the reinforced fabric. Such polymers include, but are not limited to, bitumen, asphalt, tar, various types of resins, various types of resin epoxies, polyester, polypropylene, polyethylene, polyurethane, polyacrylate, and copolymers thereof. The one or more polymers can be used to partially or fully impregnate all of or only a portion of the reinforced fabric. The one or more polymers are typically applied to the reinforced fabric by a dipping process and/or a spray coating process; however, other or additional coating processes can be used.

One non-limiting object of the present invention is the provision of a reinforced fabric that includes a plurality of closed thread loops used to maintain sets of fibers in relative position to one another.

Another and/or additional non-limiting object of the present invention is the provision of a reinforced fabric that includes a plurality of closed loops formed by one or more threads which loops are fused and/or melted together at one or more locations on the thread.

Still another and/or additional non-limiting object of the present invention is the provision of a reinforced fabric that includes a plurality of closed loops formed by one or more threads which enable one or more fibers entrapped in the loops to at least partially move relative to the loops.

Yet another and/or additional non-limiting object of the present invention is the provision of a reinforced fabric that includes one or more regions that include a plurality of closed loops formed by one or more threads which loops are fused and/or melted together at one or more locations on the thread.

These and other advantages will become apparent to those skilled in the art upon the reading and following of this description taken together with the accompanying drawing.

BRIEF DESCRIPTION OF THE DRAWING

Reference may now be made to the drawing, which illustrates one non-limiting embodiment that the invention may take in physical form and in certain parts and arrangements of parts wherein.

DETAILED DESCRIPTION OF THE INVENTION

Figure 1:
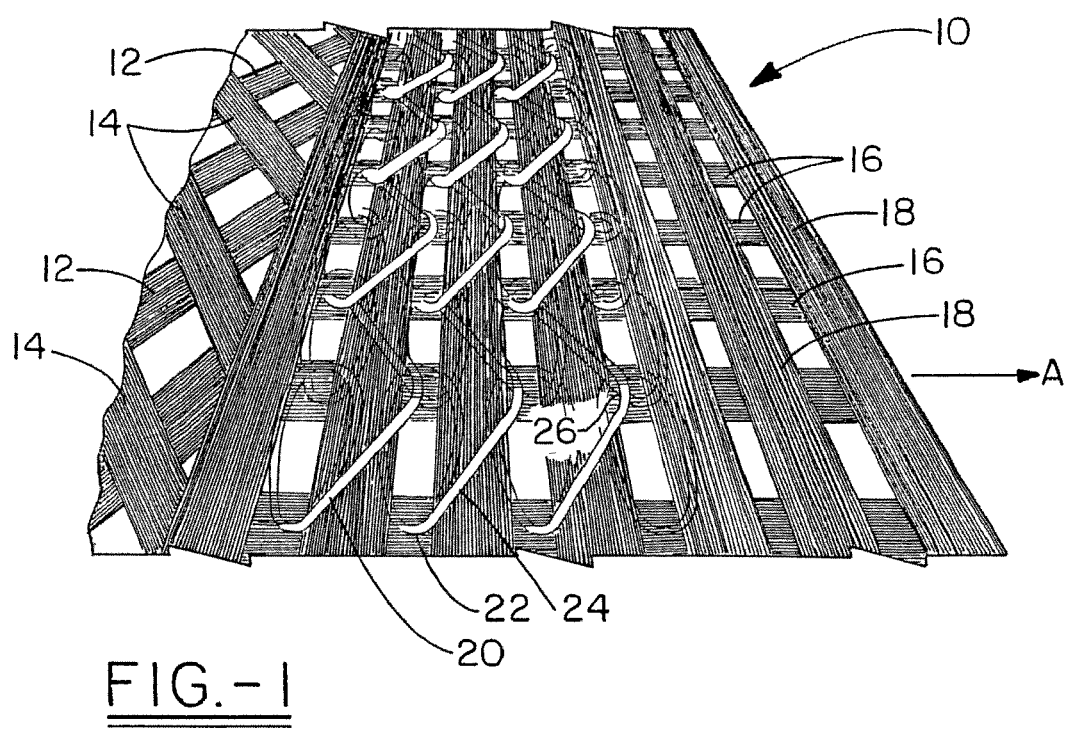
FIG. 1 is a schematic partial perspective of a reinforcing mat in accordance with the present invention.

Referring now to the drawing wherein the showing is for the purpose of illustrating a non-limiting embodiment of the invention only and not for the purpose of limiting the same, FIG. 1 illustrates a reinforced fabric 10. The reinforced fabric 10 includes four fiber groups 12, 14, 16 and 18. As can be appreciated, the reinforced fabric 10 can be formed of only one fiber group, formed of two fiber groups, formed of three fiber groups, or formed of more than three fiber groups. As such, FIG. 1 is merely illustrative of one or many types of reinforced fabrics that are encompassed by the present invention.

Each group of fibers 12, 14, 16 and 18 are formed of a plurality of fiber sets which in turn are formed from a plurality of fibers. Each set of fibers in a fiber group is illustrated as positioned relatively parallel to one another and spaced a substantially uniform distance apart from one another; however, this is not required. The fibers that are in each set of fibers and/or in each fiber group can be formed of the same or different material. The fibers in each set of fibers are disclosed as non-woven fibers; however, this is not required.

As illustrated in FIG. 1, the reinforced fabric 10 is typically constructed in a specific direction illustrated by arrow A. For instance, when the reinforced fabric is formed of two fiber groups 16, 18, fiber group 16 is first laid such that the fiber sets in fiber group 16 are generally parallel to construction direction A and spaced at a generally equal distance apart from one another. As can be appreciated, the fiber sets on fiber group 16 can be oriented in other manners relative to construction direction A. Once fiber group 16 is laid, fiber group 18 is laid on the top of fiber group 16. Fiber group 18 is illustrated as laid generally perpendicular to the laid direction of fiber group 16. As can be appreciated, fiber group 18 can be laid in many other non-parallel orientations relative to fiber group 16. As illustrated in FIG. 1, fiber group 18 is laid such that the fiber sets in fiber group 18 are generally parallel to one another and spaced at a generally equal distance apart from one another. The regions wherein the fiber set of fiber groups 16, 18 over lie one another is represented as an interstice 22. The fiber used in fiber groups 16, 18 are illustrated are being generally linear non-woven fibers. One non-limiting fiber material that can be used is glass fiber. Since the fibers are not woven together within each fiber set or with other fibers in another fiber set, the individual fibers in each fiber set no particular stability to remain in position.

In accordance with the present invention, a thread 20 is stitched into and/or about a plurality of interstices 22 between the respective fibers sets of fiber groups 16, 18. The exact method of stitching the thread into and among the interstices formed by the fibers is not considered critical to the operation of the invention. For instance, a weft knit, warp knit, tricot or chain technique can be used, among others, to stitch the thread into the reinforced fabric. The thread can be a single strand of material or formed from a plurality of strands. The one or more strands that form the thread can be formed from a single material or a composite material. The thread is selected such that the outer surface of the thread has a melting or softened temperature that is less than the melting or softened temperature of the fibers in the fiber sets of fiber groups 16, 18. In one non-limiting arrangement, the fibers are formed of glass fibers having a softening temperature of about 2000° C. and the thread 20 has a polymer outer surface with a melting temperature of less than about 500° C. The thread is stitched into and/or about a plurality of interstices 22 such that one or more loops of thread are formed about the interstices and that a portion of the thread overlaps in the formation of the loops as by portion 24 and 26 of thread 22 as illustrated in FIG. 1. The loops are designed to maintain the fiber sets of fiber groups 16, 18 in position with respect to one another.

Once the thread is stitched in the reinforced fabric, all or a portion of the reinforced fabric is heated to a temperature that is substantially below the melting or degrading temperature of the fibers and above the melting point of the outer surface of the thread. The at least partial melting of the outer surface of the thread results in the overlapping portions of the thread to bond together and form a permanent closed loop structure about the fibers. All of the thread loops on the reinforced fabric can be heated to form this permanent closed loop structure, or only a portion of the reinforced fabric can be heated so as to form a plurality permanent closed loop structures and a plurality of non-permanent closed loop structures in the reinforced fabric. The reinforced fabric is also heated for a period of time and at a temperature so as to inhibit or prevent the complete melting of the thread. Full melting of the thread can result in the damaging or breaking of the loops about the fibers. The reinforced fabric is also heated for a period of time and at a temperature so as to minimize any bonding between the softened or melted outer surface of the thread and the fibers encircled by the loops of thread. Generally, the fiber materials, thread materials, temperature setting and heating time are selected such that no more than about 5% of the fibers encircled by the loops of thread are strongly bonded to the thread after the formation of the permanent closed loop structure by the heating of the thread. More typically, the fiber materials, thread materials, temperature setting and heating time are selected such that no more than about 25% of the fibers encircled by the loops of thread are strongly bonded to the thread after the formation of the permanent closed loop structure by the heating of the thread. Even more typically, the fiber materials, thread materials, temperature setting and heating time are selected such that no more than about 45% of the fibers encircled by the loops of thread are strongly bonded to the thread after the formation of the permanent closed loop structure by the heating of the thread. Still even more typically, the fiber materials, thread materials, temperature setting and heating time are selected such that less than a majority of the fibers encircled by the loops of thread are strongly bonded to the thread after the formation of the permanent closed loop structure by the heating of the thread. Still more typically, the fiber materials, thread materials, temperature setting and heating time are selected such that less than about 30% of the fibers encircled by the loops of thread are strongly bonded to the thread after the formation of the permanent closed loop structure by the heating of the thread. Even more typically, the fiber materials, thread materials, temperature setting and heating time are selected such that less than about 10% of the fibers encircled by the loops of thread are strongly bonded to the thread after the formation of the permanent closed loop structure by the heating of the thread. Still even more typically, the fiber materials, thread materials, temperature setting and heating time are selected such that less than about 5% of the fibers encircled by the loops of thread are strongly bonded to the thread after the formation of the permanent closed loop structure by the heating of the thread. Yet even more typically, the fiber materials, thread materials, temperature setting and heating time are selected such that less than about 1% of the fibers encircled by the loops of thread are strongly bonded to the thread after the formation of the permanent closed loop structure by the heating of the thread. As used herein "strong bond" or "strongly bonded" or "strong bonding" is defined as a bond between one or more fibers and the thread that 1) results in damage (e.g., tearing, breaking, cracking, shredding, etc.) to the one or more fibers and/or thread when the one or more fibers and thread are separated from one another, and/or 2) does not allow the fiber to easily disengage from the thread and move within the permanent closed loop structure when the reinforced fabric is bend, folded or wrapped about another structure. For example, if a portion of the longitudinal length of one or more fibers was over 50% encircled by a melted portion of a thread, this would constitute a strong bond between the fiber and the thread. In another example, if a fiber could not be pulled through a loop of thread without damaging the loop and/or the fiber, this would constitute a strong bond between the fiber and the thread. Generally, the fiber materials, thread materials, temperature setting and heating time are selected such that no more than about 5% of the fibers encircled by the loops of thread are slightly bonded to the thread after the formation of the permanent closed loop structure by the heating of the thread. More typically, the fiber materials, thread materials, temperature setting and heating time are selected such that no more than about 25% of the fibers encircled by the loops of thread are slightly bonded to the thread after the formation of the permanent closed loop structure by the heating of the thread. Even more typically, the fiber materials, thread materials, temperature setting and heating time are selected such that no more than about 45% of the fibers encircled by the loops of thread are slightly bonded to the thread after the formation of the permanent closed loop structure by the heating of the thread. Still even more typically, the fiber materials, thread materials, temperature setting and heating time are selected such that less than a majority of the fibers encircled by the loops of thread are slightly bonded to the thread after the formation of the permanent closed loop structure by the heating of the thread. Still more typically, the fiber materials, thread materials, temperature setting and heating time are selected such that less than about 30% of the fibers encircled by the loops of thread are slightly bonded to the thread after the formation of the permanent closed loop structure by the heating of the thread. Even more typically, the fiber materials, thread materials, temperature setting and heating time are selected such that less than about 10% of the fibers encircled by the loops of thread are slightly bonded to the thread after the formation of the permanent closed loop structure by the heating of the thread. Still even more typically, the fiber materials, thread materials, temperature setting and heating time are selected such that less than about 5% of the fibers encircled by the loops of thread are slightly bonded to the thread after the formation of the permanent closed loop structure by the heating of the thread. Yet even more typically, the fiber materials, thread materials, temperature setting and heating time are selected such that less than about 1% of the fibers encircled by the loops of thread are slightly bonded to the thread after the formation of the permanent closed loop structure by the heating of the thread. As used herein, "slightly bonded" or "slight bond" or "slight bonding" is defined as a weak bond between one or more fibers and the thread that results in 1) essentially no damage to the one or more fibers and/or thread when the one or more fibers and thread are separated from one another, and 2) allows the fiber to easily disengage from the thread and move within the permanent closed loop structure when the reinforced fabric is bent, folded or wrapped about another structure. It is understood that when no bond is formed between the one or more fibers and thread, the lack of the bond also results in fiber to move within the permanent closed loop structure when the reinforced fabric is bent, folded or wrapped about another structure. Very little force is typically needed to separate weakly bonded fibers from the thread. For example, if a portion of the longitudinal length of one or more fibers is no more than 50% encircled by a melted portion of a thread, this would constitute slight bonding between the fiber and the thread. In another example, if a fiber could disengage from the thread without damaging the loop and/or the fiber when the reinforced fabric was bend, folded rolled into a roll of reinforced fabric or wrapped about a structure, this would constitute slight bonding between the fiber and the thread.

The formation of the permanent closed loop structure by the heating of the thread can be accomplished in a variety of ways. Typically, the reinforced fabric after being stitched, is directed between one or more sets of rollers wherein at least one of the rollers is a heated roller. As the reinforced fabric is fed between the rollers, the heat from one or more of the rollers causes the thread to be heated and to form the permanent closed loop structures in the reinforced fabric. The one or more sets of rollers can also be used to compress the fiber groups together to form a more dense reinforced fabric. The pressure applied by the one or more sets of rollers can be also used to facilitate in the formation of the permanent closed loop structures in the reinforced fabric. Alternatively, the stitched reinforced fabric can be directed into an oven to form the permanent closed loop structures in the reinforced fabric.

As described above, the reinforced fabric 10 is formed by two fiber groups 16, 18. As can be appreciated, the advantages of the present invention can be realized from a reinforced fabric having a single fiber group or a reinforced fabric having more than three fiber groups. As illustrated in FIG. 1, fiber groups 12, 14 are laid in a non-parallel relationship to fiber groups 16, 18. The sequence of laying each fiber group can be selected depending on the desired fiber group orientation for the reinforced fabric. For instance, for a reinforced fabric formed from three fiber groups, fiber group 16 can first be laid, then fiber group 18 and finally fiber group 12. Alternatively, fiber group 12 can first be laid, then fiber group 18 and finally fiber group 16. As can be appreciated, the remaining laying sequences not mentioned above can also be used. When the reinforced fabric is formed of four fiber groups, the number of different laying sequences for each of the fiber groups is increased, and all such laying sequences are encompassed by the present invention.

When more than one fiber group is used to form the reinforced fabric, the thread can be stitched in reinforced fabric at a variety of times. For instance, when the reinforced fabric is formed of two fiber groups, the thread can be stitched to the first fiber group laid prior to laying the second fiber group and then subsequently stitching the second fiber group to the first fiber group. Alternatively, the thread can be stitched after both the first and second fiber groups have been laid. When more than one stitching is to be used, the thread can be heated after each stitching or after all the stitching has been completed. As can be appreciated, when more than two fibers groups are used to form the reinforced fabric, many other combinations of stitching can be used to connect the three or more fiber groups together, and all such combinations are encompassed by the present invention.

Once the reinforced fabric is formed, the reinforced fabric can be further processed by partially or fully coating and/or impregnating the reinforced fabric with one or more polymer materials.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween.

I claim:

1. A method for forming a reinforced fabric comprising:
  a) providing a first fiber group said first fiber group including a plurality of fiber sets positioned substantially parallel to one another each of said fiber sets in eluding a plurality of fibers;
  b) providing a second fiber group, said second fiber group including a plurality of fiber sets positioned substantially parallel to one another, each of said fiber sets including a plurality of fibers;
  c) laying said second fiber group on said first fiber group such that the second fiber group is on a non-parallel relationship to said first fiber group such that said fibers in said second fiber group overlying said fibers in said first fiber group to from a plurality of interstices;
  d) providing a thread, said thread formed of at least one strand, said thread having an outer surface that is formed of a material having a melting point that is less than the melting point of said fibers in said fiber sets of said first and second fiber groups;
  e) stitching said thread about a plurality of said interstices to at least partially maintain a position of said fiber sets relative to one another to for stitched together fiber groups, said thread forming a plurality of loop structures, each of said loop structures substantially encircling at least one of said interstices; and,
  f) heating said thread at a temperature and for a period of time to at least partially fuse or melt together intersecting thread portions to form a plurality of heat created, permanent, closed loop structures in said reinforced fabric and cause less than a majority of said fibers to be strong bonded to said thread.

2. The method as defined in claim 1, including the step of heating a portion of said fibers groups such that a portion of the interstices are encircles by heat created, permanent, closed loop structures and a portion of said interstices are encircles by loop structures that are not heat created, permanent, closed loop structures.

3. The method as defined in claim 1, including the step of at least partially impregnating said first and second fiber groups with at least one polymer.

4. The method as defined in claim 1, wherein said step of heating includes feeding said stitched together fiber groups through at least one set of heated rollers.

5. The method as defined in claim 1, wherein said thread is formed of a plurality of strands, each of said strands formed of the same material.

6. The method as defined in claim 1, wherein a least one of said fibers in said first and second fiber groups is not bonded to said thread.

7. The method as defined in claim 2, wherein at least one of said fibers in said first and second fiber groups is not bonded to said thread.

8. The method as defined in claim 7, wherein a majority of said fibers in said first and second fiber groups is not bonded to said thread.

9. The method as defined in claim 8, wherein said step of heating includes feeding said stitched together fiber groups through at east one set of heated rollers.

10. The method as defined in claim 9, including the step of at least partially impregnating said first and second fiber groups with at least one polymer.

11. The method as defined in claim 10, wherein said second fiber group is laid on said first fiber group in a substantially perpendicular relationship to said first fiber group.

12. The method as defined in claim 1, including the steps of
i) providing a third fiber group, said second fiber group including a plurality of fiber sets positioned substantially parallel to one another, each of said fiber sets including a plurality of fibers;
ii) laying said third fiber group on said first or second fiber group such that said third fiber group is on a non-parallel relationship to said first or second fiber groups to from a plurality of interstices;
and wherein said thread is stitched about a plurality said interstices formed by said first, second and third fiber groups so as to at east partially maintain a position of said fiber sets relative to one another.

13. The method as defined in claim 10, including the steps of
i) providing a third fiber group, said second fiber group including a plurality of fiber sets positioned substantially parallel to one another, each of said fiber sets including a plurality of fibers;
ii) laying said third fiber group on said first or second fiber group such that said third fiber group is on a non-parallel relationship to said first or second fiber groups to from a plurality of interstices;
and wherein said thread is stitched about a plurality of said interstices formed by said first, second and third fiber groups so as to at least partially maintain a position of said fiber sets relative to one another.

14. The method as defined in claim 1, wherein said thread includes a core portion and a sheath portion, said sheath portion having a melting point that is lower than a melting point of said core portion.

* * * * *